L. A. DARLING.
TURBINE WHEEL AND BUCKET MOUNTING.
APPLICATION FILED MAR. 4, 1919.
1,362,853.
Patented Dec. 21, 1920.
3 SHEETS—SHEET 1.
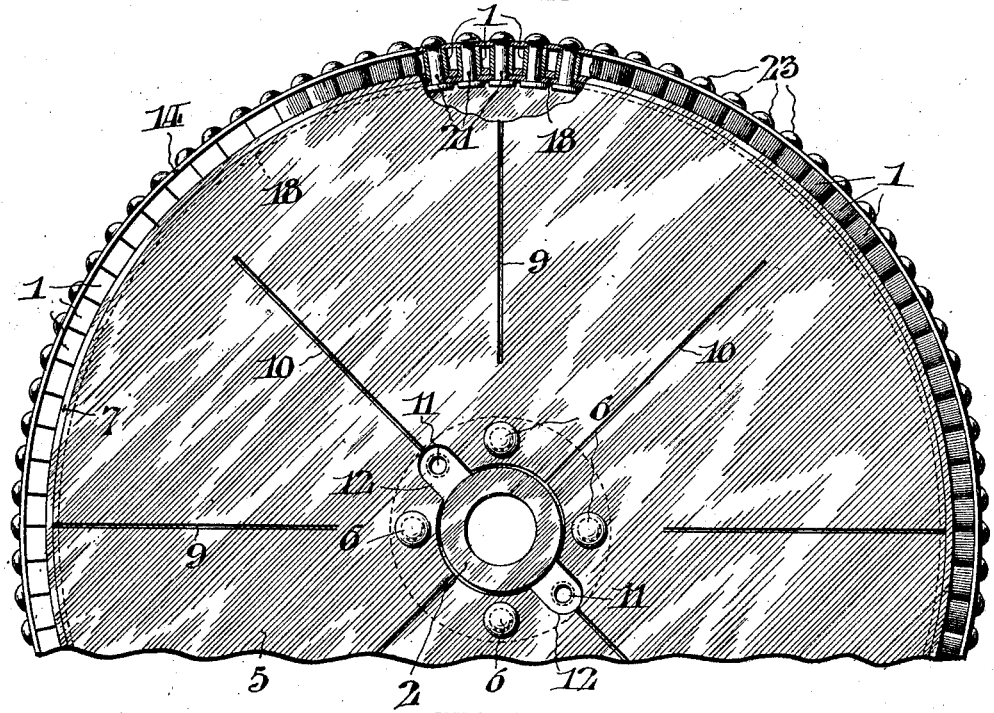
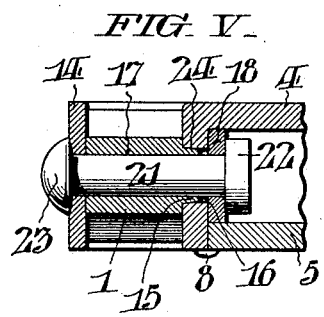
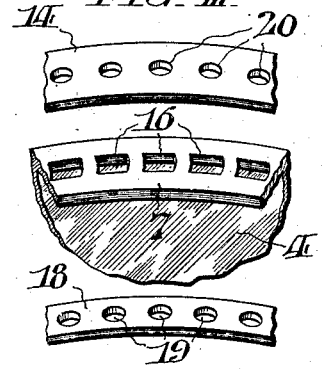
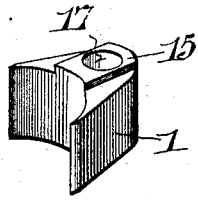
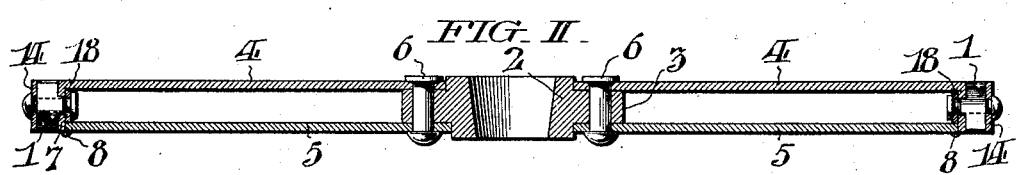
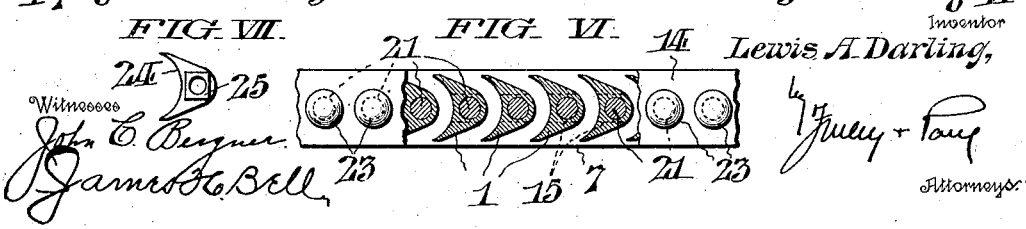

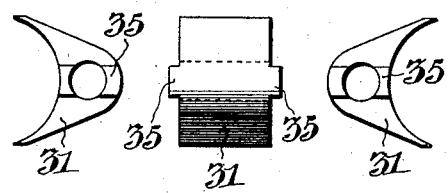
FIG. VIII.
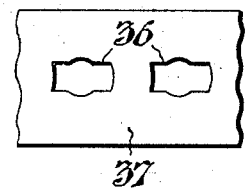
FIG. IX.
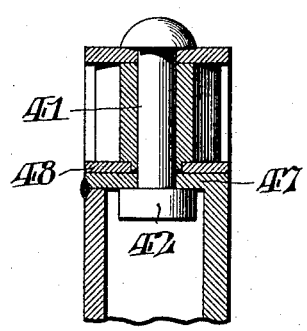
FIG. X.
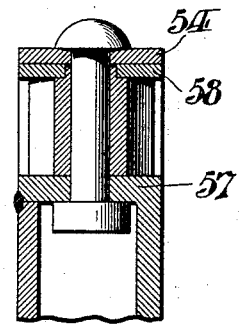
FIG. XI.
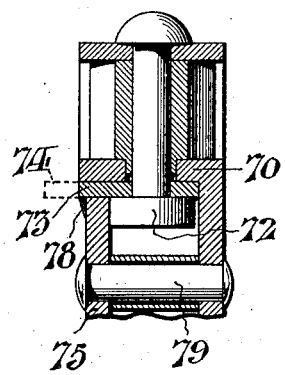
FIG. XIII.
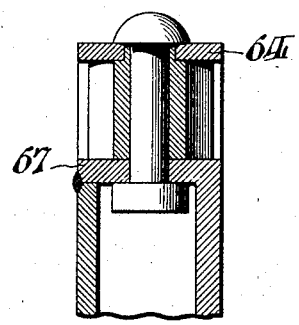
FIG. XII.

L. A. DARLING.
TURBINE WHEEL AND BUCKET MOUNTING.
APPLICATION FILED MAR. 4, 1919.
1,362,853.
Patented Dec. 21, 1920.
3 SHEETS—SHEET 3.
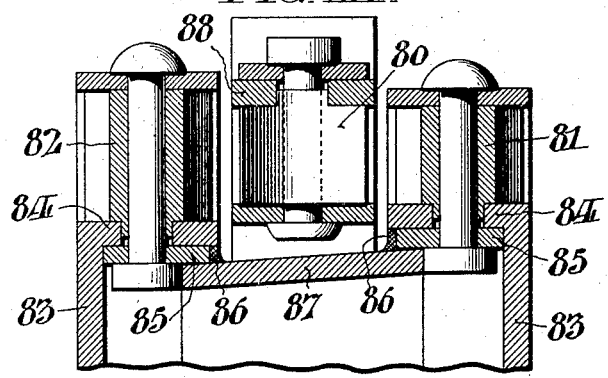
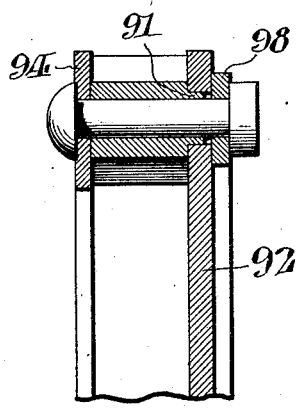
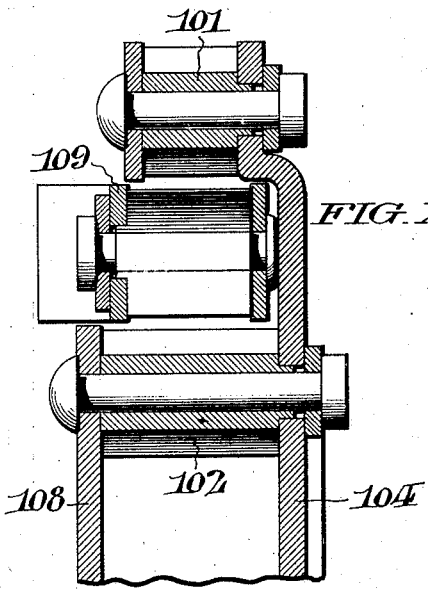
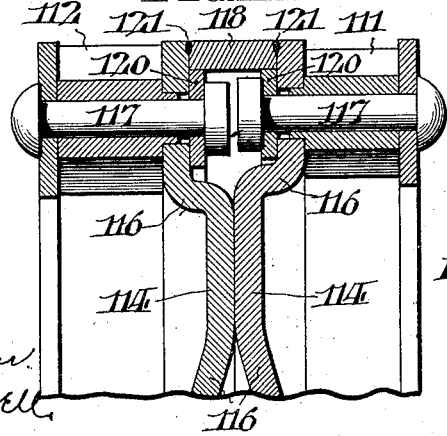
Inventor
Lewis A. Darling,

UNITED STATES PATENT OFFICE.

LEWIS A. DARLING, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA.

TURBINE-WHEEL AND BUCKET-MOUNTING.

1,362,853.   Specification of Letters Patent.   Patented Dec. 21, 1920.

Application filed March 4, 1919. Serial No. 280,564.

*To all whom it may concern:*

Be it known that I, LEWIS A. DARLING, a citizen of the United States, and a resident of Philadelphia, in the county of Philadelphia and State of Pennsylvania, have invented certain new and useful Improvements in Turbine-Wheels and Bucket-Mountings, of which the following is a specification, reference being had to the accompanying drawings.

My invention relates both to turbine buckets or blades and the adjacent parts, including the means for mounting and securing the buckets in position, and to the construction of the wheel in general. My novel mode of bucket mounting, moreover, is applicable to stationary buckets or guide blades as well as to those of the turbine wheel or rotor.

The main objects of my invention are stability and permanence of the structure, simplicity of assemblage, and general economy of manufacture. Other advantages obtainable in connection with the invention will appear from the description hereinafter of the best embodiments at present known to me.

In the drawings, Figure I, represents a partial view of an elastic fluid turbine wheel embodying my invention, showing certain features partly in side elevation and partly in broken-away sectional elevation.

Fig. II, shows an axial section through the wheel.

Fig. III, shows, in perspective, portions of the bucket mounting and securing elements of the wheel, somewhat separated for the sake of clearness of illustration.

Fig. IV, is a view of one of the buckets in perspective.

Fig. V, is a partial sectional view, on an enlarged scale, illustrating the details of one mode of securing the buckets.

Fig. VI, is a fragmentary view of the wheel viewed edgewise, the outer portion being broken away and the buckets in section.

Fig. VII, is an end view of a bucket member showing a modification.

Fig. VIII, comprises three views of a modified form of bucket, showing the rear or external face of a bucket and each end thereof.

Fig. IX, is a partial view of an external cover or securing member adapted to be used in connection with the type of bucket shown in Fig. VIII.

Figs. X, XI, XII, XIII, XIV, XV, XVI and XVII are partial sectional views (corresponding to Fig. V) of a bucket and the adjacent parts, showing various modifications of structural detail,—the general features and principles of the invention being, however, common to all the types.

Referring to Figs. I, II, and III, it will be seen that the wheel comprises a main body portion with a plurality of buckets 1, at its periphery. The main body of the wheel comprises a central hub 2, with a shouldered peripheral flange 3, and a conical shaft opening and a web formed by a pair of disks or plates 4 and 5, secured at opposite sides of the flange by rivets 6. The outer portion of the plate 4, is cupped or bent over to form an integral laterally extending peripheral flange or rim member 7 (see Fig. II), and the outer edge of the plate 5, fits closely against the inner surface of this flange 7, and affords it support at its edge.

I prefer to secure the outer edge of the rim element to the periphery of the plate 5, by means of a brazed, fused, welded, or other similar joint 8, (see Figs. II and V) which may extend entirely around the wheel or may be produced only at intervals; in either case, the object is to reinforce and strengthen the structure against distortion through centrifugal force, etc.

To avoid permanent distortion from buckling or other ill effects due to local heating and expansion of the plate 5, in the formation of the fused joint 8, this plate may be divided into segments, as by a plurality of slots 9, (see Fig. I), shown as extending radially inward from its periphery nearly to its hub opening; and if found advisable, it may be further segmented by intermediate slots 10, extending outward from its hub opening nearly to its periphery. If it be preferred to make the plate 5, in a plurality of segments originally rather than to slot them, it is still advantageous to unite the metal of the segments at the ends of the slots, by welding, brazing, or fusing. As a further provision against warping of the wheel, the hub opening in plate 5, may be made a free, loose fit and the final centering and securing of this plate to the hub may be done after the fused joint has been formed and the parts have cooled and taken their set, the holes therein for the rivets 6, being drilled after the fusing operation.

Screw-threaded holes 11, in the hub flange 3, afford a convenient means for removing the wheel from its shaft at any time; as shown, the plate 5, is cut away or notched at 12, to expose this portion of the flange 3.

As shown in Figs. I and II, the buckets 1, are seated endwise against the rim member 7, and have on their other ends a shroud or cover mounting-element 14. This cover element 14, need not necessarily be in sections, but may, if preferred, have the form of a single solid band, as shown. From Figs. III, IV, V, and VI, it will be seen that the buckets 1, have at their ends which abut against the rim member 7, anti-turning engagement means in the form of short central lugs or key projections 15, upstanding from their end surfaces, and that the rim member 7, has a correlative feature in the form of a series of closely spaced apertures 16, of suitable shape to fit the lugs 15. As shown, lugs and apertures are approximately parallelograms in general outline. but it will be obvious that a great variety of shapes will fulfil the anti-turning function. Holes 17, (Fig. IV) extend lengthwise through the buckets, about centrally in the lugs 15. (In Fig. IV, the bucket is shown in what may be called an inverted position; in the wheel, the lug 15, is on the under and inner end of the bucket, i. e., the end toward the axis of the wheel.) It will be seen that the engagement means 15, 16, positively prevents turning of the buckets 1, on the rim member and at the same time allows them to be seated in final position by a simple endwise movement,—which facilitates and quickens assemblage. In securing the buckets 1, on the rim member 7, there is employed a supplemental member (see Figs. I, II, III, and V) which may preferably be in the form of a continuous band 18, with holes 19, at intervals corresponding to the spacing of the apertures 16, rather than in a multiplicity of pieces or sections. This supplemental rim member 18, lies against the inner surface of the main rim member 7, and thus forms with it the complete bucket-carrying rim element of the mounting. The bucket-engaging cover element 14, has holes 20, corresponding to the apertures 16, and holes 19, in the composite rim mounting-element, and securing members 21, extend from cover to rim and secure them together independently of the buckets 1. As shown in Figs. I, II, V, and VI, these securing members 21, are in the form of rivets whose shanks pass through the bucket holes 17, and whose heads engage the rim and cover mounting-elements 14 and 17, 18. The rivets 21, are inserted from inside the supplemental member 18, with their original heads or bases 22, against its inner surface, and their outer ends are headed or spun over on the cover element 14, as shown at 23, before the plate 5, is put in place and secured. If the side surfaces of the lugs 15, be inclined or tapered, as shown at 24, in Fig. V, the wedging action will cause the buckets to seat easily and to be held very snugly and firmly, even though the sides of the apertures 16, be simply punched in the ordinary way.

In Fig. VII, I have shown a bucket 24, whose lug 25, is perfectly rectangular instead of having its front and rear surfaces mere prolongations of those of the bucket. Its sides may all be inclined or tapered for the purpose explained in connection with Fig. V. Such a formation also facilitates rapid assemblage.

In Figs. VIII and IX, the bucket 31, has lugs 35, 35, somewhat similar to the lug 15, of Fig. IV, on both its ends, and the bucket hole is of a diameter which slightly exceeds the width of the lugs. As shown in Fig. IX, the apertures 36, of the flange or rim member 37, are adapted to receive not only the lug, but also the laterally projecting portion of the rivet shank. The apertures of the cover element corresponding to the element 14, of Figs. I and VI, are, of course, of similar shape.

In Fig. X, is shown a modification in which the rivet 41, has its base 42, engaged directly against the inner surface of the main flange or rim member 47, the supplemental member 48, being no longer subjacent thereto, but transposed to the outer face of said main member and provided with the apertures for the anti-turning bucket lugs. In Fig. XI, the buckets have been turned end for end from Fig. X, with reference to the "main" cover member 54, and to the rim mounting-element 57, and the cover element has become the composite one,—the supplemental member 58, lying directly against the inside of said main cover member 54. There being no anti-turning engagement means at the rim-abutting ends of the buckets in this construction, it naturally admits of their being seated on the rim element 57 by simple endwise movement just as do the constructions already described. In the modification of Fig. XII, the supplemental member has been dispensed with altogether, and its lug-engaging function in Fig. XI, has been transferred to the cover member 64, whose apertures are made of appropriate shape for this purpose. As in Fig. XI, the rim mounting element comprises but a single member 67.

In Fig. XIII, I have shown a modification in which a supplemental member is, once more, employed, and arranged inside the main rim member 70, so as to engage the rivet heads 72. Here this subjacent supplemental rim member 73, is originally so wide as even to project beyond the edge of the main rim member or flange 70, as indicated in dotted lines at 74, the plate 75, being of such diameter as to fit inside of it. As shown, it lies against the rivet heads 72, which thus take the place of the member 18, in Figs. II and VI, in supporting it in proper position until finally secured. The main rim member 70, is so wide as to overhang the disk or plate 75, so that a shoulder is provided within which the fused joint 78, may lie, and the superjacent buckets and members are shielded from the direct effect of the heat incident to the formation of the joint. After the fusing operation (which may be carried out by means of an acetylene torch with a suitable rod of metal to build up the joint), the dotted portion 74, of the member 73, may be removed by machining or otherwise, leaving a good volume of added metal under the overhang of said member in the form of a "filleted" joint. As shown, the plate 75, is also secured to its fellow by rivets 79, spacing sleeves about them serving to prevent deformation of the plates when they are headed over.

In Fig. XIV, the wheel is shown as provided with a double row of peripheral buckets,—a stationary set of buckets 80, in the interval between them acting to deflect motive fluid issuing from the first set 81, into the openings of the somewhat larger second set 82. The body of the wheel comprises two plates 83, 83, having inturned rim members or flanges 84, 84, and two sets of buckets 81, 82, may be mounted in any of the ways already set forth,—Fig. XIV, showing substantially the mode of Figs. I to VI. The rim members 84, 84. overhang the supplemental members 85, 85, and at their outer edges are fused joints 86, 86. The joints 86, 86, also secure to the flange and tie into the structure as a reinforcement a band 87, which fits snugly beneath the members 84, 84. The row of stationary buckets 80, are mounted on the supporting flange or "rim" members 88, that carries them in about the same way that the moving buckets 81, 81, are mounted.

As thus far described, the buckets have all been arranged for what is known as "axial flow," in which the general direction of flow of the motive fluid is in a plane or surface approximately parallel to the turbine axis. In the remaining figures, my invention is shown as adapted to wheels of what is known as the "radial flow" type,— *i. e.*, in which the motive fluid flows in a generally radial direction with relation to the axis.

In Fig. XV, is shown a wheel with a single row of buckets 91, at the periphery of a single plate 92. The structure may be regarded as evolved from that of Figs. I to VI, by straightening out the bucket mounting rim element into the plane of the web portion of the plate 92, so that the cover member 94, and the supplemental member 98, are become flat rings.

In Fig. XVI, the wheel is provided, by a similar mode of construction, with successively acting sets of radial flow buckets 101 and 102, carried by the wheel plate 104, which is offset or "joggled" in its rim portion so as to provide for properly alining the two sets. The smaller outer set 101, have a flat ring cover element like the cover element 94, of Fig. XV; the cover element of the larger inner set 102, is shown as a plain, flat wheel plate 108, of suitable diameter. Intervening stationary reguide buckets or passes are provided, and are shown as mounted on a supporting "rim" member 109, very much as the buckets 101, are mounted.

In Fig. XVII, the wheel has two peripheral sets or rows of radial flow buckets 111, 112. Suitable re-guide buckets or passes for conducting the motive fluid from the smaller set of buckets 111, to the larger set 112, may, of course, be provided. Structurally, the device consists of two wheels similar to that of Fig. XV,—or to that of Fig. XVI, with omission of the buckets 102, and the associated parts—secured back to back, as by spot welding. The wheel plates 114, 114, are dished as shown at 115, to make the structure more rigid and to admit of a hub being mounted between them as in Figs. I and II, and are joggled or offset at 116, 116, to separate the rim elements and to provide space for means for feeding motive fluid to the buckets. A ring or band 118, is preferably inserted between the outer edges of the wheel plates 114, 114, against the outer edges of the supplemental members 119, 119, and secured to said plates by fused joints 121, 121.

From the foregoing description, it will be evident that my invention affords great simplicity of construction combined with structural strength and rigidity; also, that it is applicable with special advantage to very small turbines.

Having thus described my invention, I claim:

1. In a turbine wheel, the combination of a hub; a web comprising a pair of sheet metal disks or plates secured to opposite sides of said hub and peripherally secured together, with a peripheral bucket-mounting flange or rim element extending laterally from one of them and having a series of holes therethrough; a plurality of buckets seated endwise against said rim element, and adapted to be so seated in final position by simple endwise movement; a cover mounting-element on the other ends of said buckets, said cover element having holes registering with those of the rim element and buckets, and said buckets having at one end engagement means engaged in corresponding holes in the corresponding mounting-element to prevent the buckets from turning; and rivets extending through rim, buckets and cover and securely fastening them together.

2. In a turbine wheel, the combination of a disk with a peripheral bucket-mounting rim element extending laterally therefrom; a plurality of buckets seated endwise against said rim element and secured thereto; and another disk with its periphery fitting within the edge of said rim element and secured thereto by a fused joint.

3. A device in accordance with claim 2, wherein the last mentioned disk is divided into a plurality of segments, in combination with a central hub secured to the disks.

4. The method of constructing the device set forth in claim 3, which consists in centering and finally securing the hub to the segmented disk aforesaid after the formation of the fused joint.

5. In a turbine wheel, the combination of a disk with a peripheral apertured flange or main rim member extending laterally therefrom; a subjacent supplemental rim member with holes corresponding to the apertures in said main rim member; a plurality of buckets seated endwise against said main rim member with anti-turning lugs on their end surfaces engaged in its apertures, said buckets having holes lengthwise therethrough; securing members with heads engaging said supplemental rim member extending through the holes therein and through the bucket holes; and another disk with its periphery fitting within the edge of said supplemental rim member and secured thereto by a fused joint.

6. The method of constructing the device of claim 5, which consists in assembling the parts as therein set forth, with a supplemental rim member wide enough to project beyond the edge of the main rim member and shield the superjacent parts; forming the joint while said parts are so shielded from the heat incident to its formation; and subsequently removing the projecting portion of said supplemental member.

7. In a turbine wheel, the combination of a disk with a peripheral apertured flange or main rim member extending laterally therefrom; a subjacent supplemental rim member with holes corresponding to the apertures in said main rim member; a plurality of buckets seated endwise against said main rim member with anti-turning lugs on their end surfaces engaged in its apertures, said buckets having holes lengthwise therethrough; and securing members with heads engaging said supplemental rim member extending through the holes therein and through the bucket holes.

8. A turbine bucket mounting, comprising, in combination, a rim mounting-element; a plurality of buckets seated endwise against said rim element; a cover-mounting element on the other end of said buckets; each of said buckets having at one end a lug extending from face to back thereof and engaged in a correlative aperture in the corresponding mounting-element to prevent the bucket from turning, and also having a hole extending lengthwise therethrough and through said lug, and of larger diameter than its width, so as to divide it in two; and a plurality of securing members extending from cover to rim and securing them together independently of said buckets.

9. A turbine bucket mounting comprising, in combination, a rim mounting-element; a plurality of buckets with holes lengthwise therethrough seated endwise against said rim element; a cover mounting-element on the other end of said buckets, each of said buckets having at one end an appropriately shaped lug upstanding from its end surface with the aforesaid bucket hole extending therethrough, and the corresponding mounting-element comprising superposed main and supplemental members of which the one adjacent the buckets has appropriately shaped apertures in anti-turning engagement with the aforesaid bucket lugs; and a plurality of headed securing members extending from cover to rim through the buckets with their heads in engagement with the cover member and with the rim member away from the buckets.

10. A turbine bucket mounting in accordance with claim 9, wherein the rim element embodies the anti-turning engagement means in its main member, and the supplemental member lies at the side of the main member away from the buckets and engages the heads of the securing members.

11. A turbine bucket with a hole for a securing member extending lengthwise thereof from end to end, and an anti-turning lug narrower than the diameter of said hole upstanding from its end surface and divided in two by said hole.

In testimony whereof, I have hereunto signed my name at Philadelphia, Pennsylvania, this 15th day of February, 1919.

LEWIS A. DARLING.

Witnesses:
JAMES H. BELL,
E. L. FULLERTON.